Patented Oct. 14, 1941

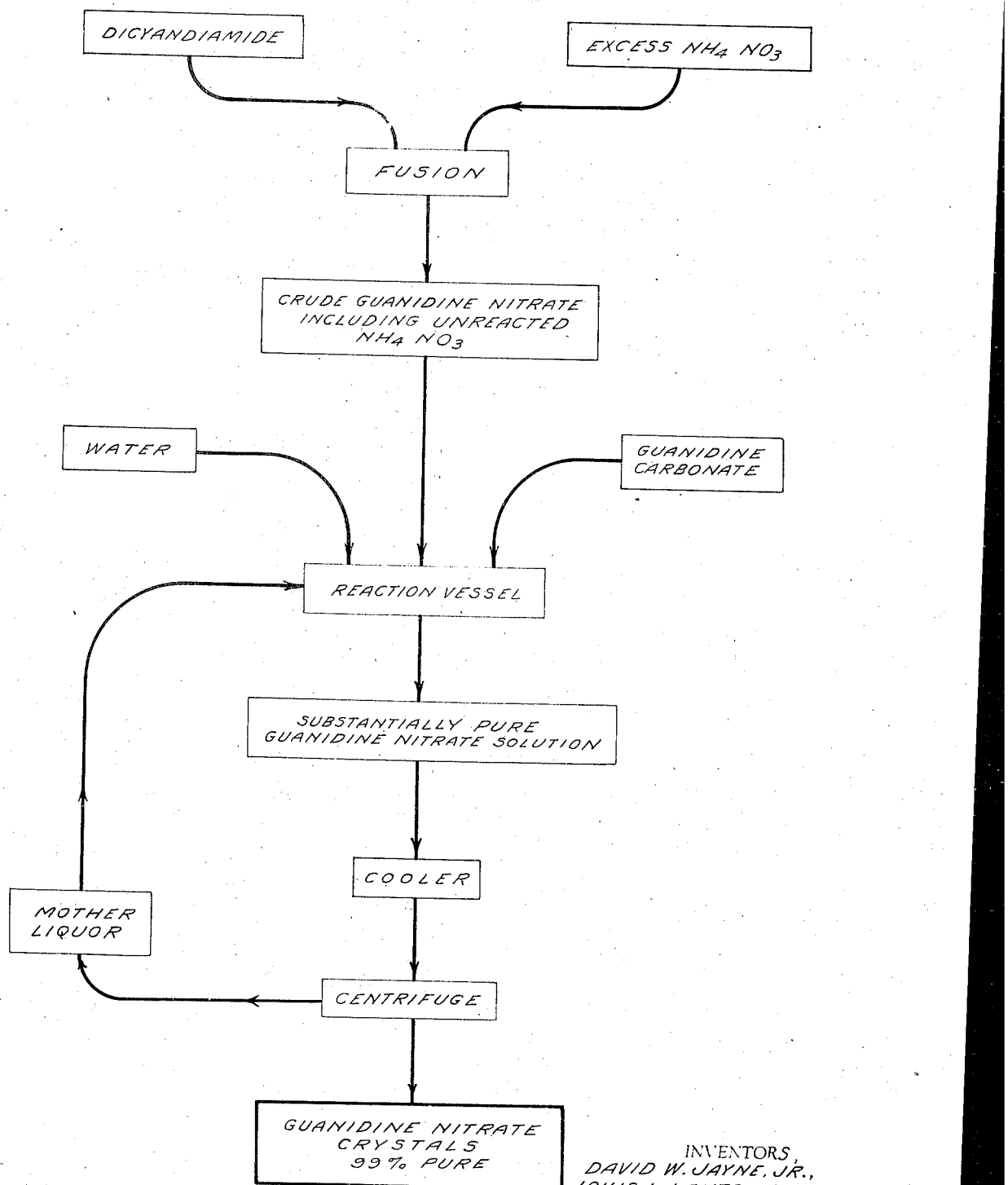

2,258,612

UNITED STATES PATENT OFFICE 2,258,612

METHOD OF PURIFYING GUANIDINE NITRATE

David W. Jayne, Jr., Old Greenwich, and Louis L. Lento, Jr., Stamford, Conn., assignors to American Cyanamid Company, New York, N. Y., a corporation of Maine Application December 23, 1939, Serial No. 310,712

4 Claims. (Cl. 260—564)

The present invention relates to a method of preparing guanidine nitrate and to a method of purifying that compound containing quantities of ammonium nitrate.

The accompanying drawing is a flow sheet of the claimed process.

It has been proposed that guanidine nitrate may be obtained simply by the fusion of dicyandiamide with ammonium nitrate using proper proportions so as to obtain a reasonably pure product. This is difficult by reason of the fact that dicyandiamide, ammonium nitrate, and guanidine nitrate are heat decomposable and moreover, it is difficult to get the last traces of the reactants to combine. As a consequence, the product of this method contains contaminated quantities of the original reactants, as well as a certain amount of the thermal decomposition products thereof and of guanidine nitrate.

It has been discovered that if an excess of ammonium nitrate is reacted with dicyandiamide, a simple fusion will result in the combination of all of the latter so that the end product is a crude guanidine nitrate contaminated only with ammonium nitrate. If to this crude product is added guanidine carbonate either in just sufficient amounts to react with the excess ammonium nitrate or even in excess, the ammonium nitrate is converted to guanidine nitrate. If the carbonate is used in excess, the amount over and above that necessary to combine with ammonium nitrate goes into solution. Due, however, to the different solubilities between guanidine carbonate and guanidine nitrate, the latter may be separated from the former by cooling and crystallization.

The preferred method, however, is to use a slight excess of guanidine carbonate, that is, more than sufficient to react with the residual ammonium nitrate and after boiling, to remove ammonia and carbon dioxide, adjusting the pH of the solution to approximately 5 with, for instance, 1:1 nitric acid, so as to decompose the excess guanidine carbonate and enrich the solution with guanidine nitrate.

Such a procedure may be used to produce guanidine nitrate better than 99% pure by a single crystallization step.

The mother liquor from the crystallization may be returned to the reaction vessel containing crude guanidine nitrate containing unreacted ammonium nitrate, for reaction with additional quantities of guanidine carbonate. Thus the method may be advantageously practiced as a cyclic procedure.

For example, 46 parts of dicyandiamide are reacted with 88 parts of ammonium nitrate, which represents 10% excess of the latter. By placing about a quarter of the mixed charge in an enamel-lined evaporating pan equipped with a steam jacket, at 130° C. the charge is completely melted, whereupon the rest of the mixed batch is added thereto over a period of from 1¼ to 2 hours. During this time, it is desirable to break up the lumps which form, as with a stainless steel paddle. The heating is continued until a temperature of from 160 to 170° C. is reached, at which point the reaction is quite vigorous and a considerable amount of heat is evolved. At this stage of the reaction, the use of extraneous heat is unnecessary. The temperature of the batch eventually rises to 210 to 220° C. at which point the product starts to crystallize. Stirring with a paddle may serve to prevent solidification into a large cake. When the temperature drops to 180° C., the batch is discharged and spread out to cool. The product contains approximately 90% guanidine nitrate, the remainder being principally unreacted ammonium nitrate.

Equal quantities of water and this crude guanidine nitrate were heated to 100° C. and the theoretical amount of guanidine carbonate necessary to convert the ammonium nitrate to guanidine nitrate was added slowly. The solution was boiled to liberate the thus formed carbon dioxide and ammonia. The pH of the solution was then adjusted to 5 with 1:1 nitric acid to decompose any excess guanidine carbonate, the solution cooled to 20° C., the crystals centrifuged and dried at 110° C. The dry product was guanidine nitrate substantially 99% pure. The mother liquor from the crystallization step was returned to the reaction vessel and the cycle repeated.

This cycle was carried out five or six times in order to be sure that the mother liquor could be re-cycled indefinitely. The fact that on the last run the purity of the guanidine carbonate was greater than 98% showed that the motor liquor need never be discarded.

It is desirable that in the cyclic process the guanidine carbonate be added to the cold mother liquor and the complete charge be heated in order to avoid decomposition of the guanidine carbonate by heat before it has a chance to react with the ammonium nitrate.

While the invention has been shown and described with particular reference to specific embodiments, it is to be understood that it is not to be limited thereto but is to be construed broadly and restricted solely by the scope of the appended claims.

We claim:

1. A method of purifying a crude mixture comprising essentially guanidine nitrate and containing some ammonium nitrate which includes reacting the latter with guanidine carbonate and recovering guanidine nitrate from the reaction product.

2. A method of purifying a crude mixture comprising essentially guanidine nitrate and containing some ammonium nitrate which includes dissolving the crude in water, adding sufficient guanidine carbonate to metathetically react with the ammonium nitrate, boiling to remove ammonia and carbon dioxide and cooling to a guanidine nitrate crystallizing temperature.

3. A method of purifying a crude mixture comprising essentially guanidine nitrate and containing some ammonium nitrate which includes dissolving the crude in water, adding more than sufficient guanidine carbonate to metathetically react with the ammonium nitrate, boiling to remove ammonia and carbon dioxide, adjusting the pH of the solution to 5 with $HNO_3$ and cooling to a guanidine nitrate crystallizing temperature.

4. A method of purifying a crude mixture comprising essentially guanidine nitrate and containing some ammonium nitrate which includes dissolving the crude in water, adding more than sufficient guanidine carbonate to metathetically react with the ammonium nitrate, boiling to remove ammonia and carbon dioxide, adjusting the pH of the solution to 5 with $HNO_3$ and cooling to a guanidine nitrate crystallizing temperature, filtering and returning the mother liquor to the cycle.

DAVID W. JAYNE, Jr.
LOUIS L. LENTO, Jr.